(12) United States Patent
Kang

(10) Patent No.: US 12,539,848 B2
(45) Date of Patent: Feb. 3, 2026

(54) VEHICLE AND METHOD OF CONTROLLING THE SAME

(71) Applicant: HYUNDAI MOBIS CO., LTD., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 174 days.

(21) Appl. No.: 18/517,811

(22) Filed: Nov. 22, 2023

(65) Prior Publication Data

US 2024/0217512 A1 Jul. 4, 2024

(30) Foreign Application Priority Data

Jan. 4, 2023 (KR) .................... 10-2023-0001403

(51) Int. Cl.
| | |
|---|---|
| *B60W 30/095* | (2012.01) |
| *B60W 50/00* | (2006.01) |
| *B60W 50/06* | (2006.01) |
| *B60W 50/14* | (2020.01) |
| *G08G 1/16* | (2006.01) |

(52) U.S. Cl.
CPC .......... *B60W 30/095* (2013.01); *B60W 50/06* (2013.01); *B60W 50/14* (2013.01); *G08G 1/16* (2013.01); *B60W 2050/0085* (2013.01); *B60W 2554/80* (2020.02)

(58) Field of Classification Search
CPC ........ B60K 35/00; B60Q 9/008; B60R 40/04; B60W 30/095; B60W 30/0953; B60W 30/0956; B60W 50/06; B60W 50/14; B60W 2050/0085; B60W 2050/143; B60W 2554/4041; B60W 2554/4044; B60W 2554/80; B60W 2554/801; B60W 2554/802; B60W 2554/805; B60W 2554/806; B60Y 2400/90; G08G 1/16
USPC ....................................... 701/301
See application file for complete search history.

(56) References Cited

U.S. PATENT DOCUMENTS

| | | | |
|---|---|---|---|
| 8,762,043 B2* | 6/2014 | Eidehall | B62D 15/0265 |
| | | | 701/302 |
| 2017/0076599 A1* | 3/2017 | Gupta | G08G 1/09623 |
| 2017/0247054 A1* | 8/2017 | Lee | B62D 15/029 |
| 2018/0144635 A1* | 5/2018 | Jeon | G08G 1/166 |
| 2018/0281857 A1* | 10/2018 | Choi | B62D 6/003 |

(Continued)

FOREIGN PATENT DOCUMENTS

| | | | | |
|---|---|---|---|---|
| CA | 3111387 A1 * | 9/2021 | | B60Q 1/525 |
| DE | 10 2008 026 396 B4 | 5/2016 | | |

(Continued)

OTHER PUBLICATIONS

Extended European Search Report in corresponding European Patent Application No. 23210493.5 issued on Apr. 15, 2024.

*Primary Examiner* — Atul Trivedi
(74) *Attorney, Agent, or Firm* — MORGAN, LEWIS & BOCKIUS LLP

(57) ABSTRACT

A method of controlling a vehicle includes detecting a position of a target vehicle and sequentially setting an initial detection position and a subsequent detection position of the target vehicle, determining an approach angle of the target vehicle based on the initial detection position and the subsequent detection position, and controlling whether to send a warning of a collision based on the approach angle.

16 Claims, 6 Drawing Sheets

(56) References Cited

U.S. PATENT DOCUMENTS

| | | | |
|---|---|---|---|
| 2018/0346026 A1* | 12/2018 | Fujii | B62D 15/025 |
| 2019/0106108 A1* | 4/2019 | Wienecke | B60W 30/162 |
| 2019/0111874 A1* | 4/2019 | Harada | G01S 13/588 |
| 2020/0074863 A1* | 3/2020 | Jung | G01S 13/865 |
| 2020/0139963 A1* | 5/2020 | Kim | B60W 10/18 |
| 2020/0216063 A1* | 7/2020 | Lim | B60W 50/14 |
| 2021/0271263 A1* | 9/2021 | Nobukawa | H04W 4/46 |
| 2021/0300360 A1* | 9/2021 | Sasin | B60W 30/18154 |
| 2022/0073090 A1* | 3/2022 | Kakeshita | G06V 10/56 |
| 2022/0189293 A1 | 6/2022 | Kang | |
| 2022/0343094 A1* | 10/2022 | R N | G06V 10/95 |
| 2023/0095384 A1* | 3/2023 | Sharma Banjade | G08G 1/096725 701/301 |
| 2023/0280747 A1* | 9/2023 | Cho | G08G 1/09675 701/23 |
| 2023/0331298 A1* | 10/2023 | Alghooneh | B60W 50/14 |
| 2023/0415734 A1* | 12/2023 | Zhu | G01S 13/931 |
| 2024/0038063 A1* | 2/2024 | Dulberg | G08G 1/005 |
| 2025/0263093 A1* | 8/2025 | Bhanushali | B60W 50/14 |

FOREIGN PATENT DOCUMENTS

| | | | | |
|---|---|---|---|---|
| DE | 102020202785 A1 * | 9/2020 | | G08G 1/166 |
| DE | 10 2020 128 484 A1 | 5/2021 | | |
| EP | 4067813 A1 * | 10/2022 | | G01S 17/931 |
| JP | 2016224501 A * | 12/2016 | | |
| JP | 6881219 B2 * | 6/2021 | | G01S 13/87 |
| JP | 6881982 B2 * | 6/2021 | | G08G 1/166 |
| JP | 2022123690 A * | 8/2022 | | |
| JP | 2022123691 A * | 8/2022 | | |
| JP | 2024112588 A * | 8/2024 | | B60W 60/0053 |
| WO | WO-2018094374 A1 * | 5/2018 | | B60S 1/56 |
| WO | WO-2021079975 A1 * | 4/2021 | | H04N 7/181 |
| WO | WO-2022140657 A1 * | 6/2022 | | G01S 17/931 |

* cited by examiner

VEHICLE AND METHOD OF CONTROLLING THE SAME

CROSS-REFERENCE TO RELATED APPLICATION

The present application claims priority of Korean Patent Application No. 10-2023-0001403 filed on Jan. 4, 2023, the entire contents of which are incorporated herein for all purposes by this reference.

TECHNICAL FIELD

The present disclosure relates to a vehicle and a method of controlling the same, which improve the accuracy of a warning of a collision with a target vehicle that approaches a vehicle.

BACKGROUND

An advanced driver assistance system (ADAS) refers to a technology that allows a vehicle to autonomously recognize and determine some of many situations, which may occur while the vehicle travels, and control mechanical devices in the vehicle. The functions related to autonomous driving are being ultimately developed.

The ADAS system may provide a rear side warning function such as a rear cross-traffic alert (RCTA) and a door open warning (DOW). The rear side warning function detects whether a target vehicle, which is detected by rear radar sensors, approaches left and right sides of the vehicle. The rear side warning function sends a warning of a collision with the target vehicle depending on the detection result.

In this case, in order to determine whether to send a warning of a collision with the target vehicle, the ADAS system may consider an approach angle of the target vehicle, a predicted position of a collision with the target vehicle, and the like. In general, the ADAS system determines an approach angle of the target vehicle and a predicted position of a collision with the target vehicle based on a longitudinal velocity and a transverse velocity of the target vehicle. However, in case that an error related to the velocity of the target vehicle increases, errors related to the approach angle and the predicted position of a collision also increase, which may degrade the accuracy of a warning of a collision.

In case that the accuracy of the warning of a collision is degraded, an erroneous warning situation may occur in which a warning of a collision is sent in a situation in which the warning of a collision is not required. Further, a non-warning situation may occur in which a warning of a collision is not sent in a situation in which the warning of a collision is required.

The foregoing explained as the background is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to provide a vehicle and a method of controlling the same, which improve accuracy of a warning of a collision by determining an approach angle of a target vehicle and a predicted position of a collision based on a position of a target vehicle detected by a radar sensor and controlling whether to send a warning of a collision with the target vehicle based on the determination result.

Technical problems to be solved by the present disclosure are not limited to the above-mentioned technical problems, and other technical problems, which are not mentioned above, may be clearly understood from the following descriptions by those skilled in the art to which the present disclosure pertains.

According to one aspect, there is provided a method of controlling a vehicle, the method including: detecting a position of a target vehicle and sequentially setting an initial detection position and a subsequent detection position of the target vehicle; determining an approach angle of the target vehicle based on the initial detection position and the subsequent detection position; and controlling whether to send a warning of a collision based on the approach angle.

According to one aspect, there is provided a vehicle including: a sensing part configured to detect a position of a target vehicle and output sensing data; and a warning-sending control part configured to sequentially set an initial detection position and a subsequent detection position of the target vehicle based on the sensing data, determine an approach angle of the target vehicle based on the initial detection position and the subsequent detection position, and control whether to send a warning of a collision depending on the approach angle.

According to the present disclosure, it is possible to improve the accuracy of a warning of a collision by determining the approach angle of the target vehicle and the predicted position of a collision based on a position of a target vehicle detected by the radar sensor and controlling whether to send a warning of a collision with the target vehicle based on the determination result.

The effects capable of being obtained by the present disclosure are not limited to the aforementioned effects, and other effects, which are not mentioned above, will be clearly understood by those skilled in the art from the following description.

DETAILED DESCRIPTION

Figure 1:
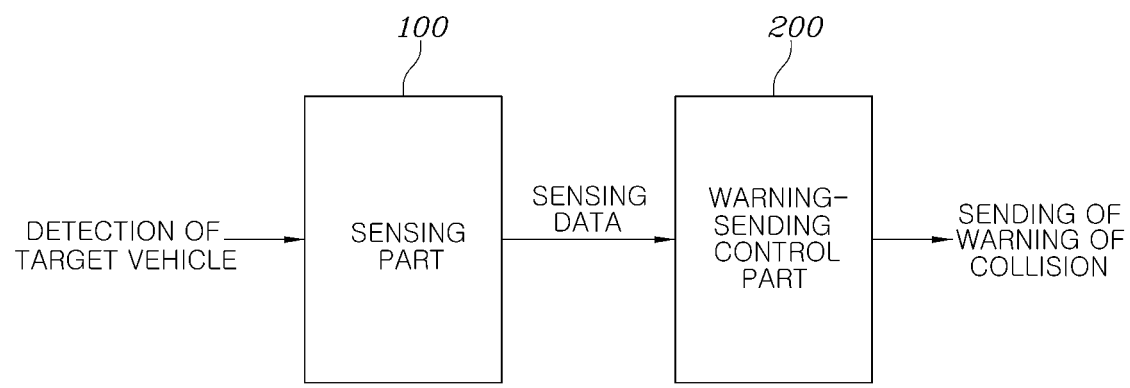
FIG. 1 is a block diagram illustrating a configuration of a vehicle according to an embodiment of the present disclosure.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, the term "control unit" or "unit" included in the name of "motor control unit (MCU)" is merely a term widely used to name a control device (controller or control unit) for controlling a particular vehicle function but does not mean a generic function unit. For example, the control unit may include a communication device configured to communicate with another control unit or a sensor to control a corresponding function, a memory configured to store an operating system, a logic command, and input/output information, and one or more processors configured to perform determination, computation, decision, or the like required to control the corresponding function.

FIG. 1 is a block diagram illustrating a configuration of a vehicle according to an embodiment of the present disclosure.

As illustrated in FIG. 1, the vehicle may include a sensing part 100 and a warning-sending control part 200. An advanced driver assistance system (ADAS) or an autonomous driving system may be applied to the vehicle according to the present embodiment.

The sensing part 100 may detect a position, a velocity, and the like of a target vehicle, which approaches the vehicle, and output sensing data. In the present embodiment, the sensing part 100 may be implemented as a radar sensor provided at a rear side of the vehicle. However, the present disclosure is not necessarily limited thereto.

The warning-sending control part 200 may determine whether the vehicle and the target vehicle collide with each other based on the sensing data outputted from the sensing part 100. The warning-sending control part 200 may control whether to send a warning of a collision with the target vehicle based on the determination result. For example, in case that the warning-sending control part 200 determines that the vehicle will collide with the target vehicle, the warning-sending control part 200 may perform control to send a warning of a collision through a display or the like so that a driver recognizes the warning. Further, the warning-sending control part 200 may perform control to perform emergency braking, door locking, or the like on the vehicle.

Figure 2:
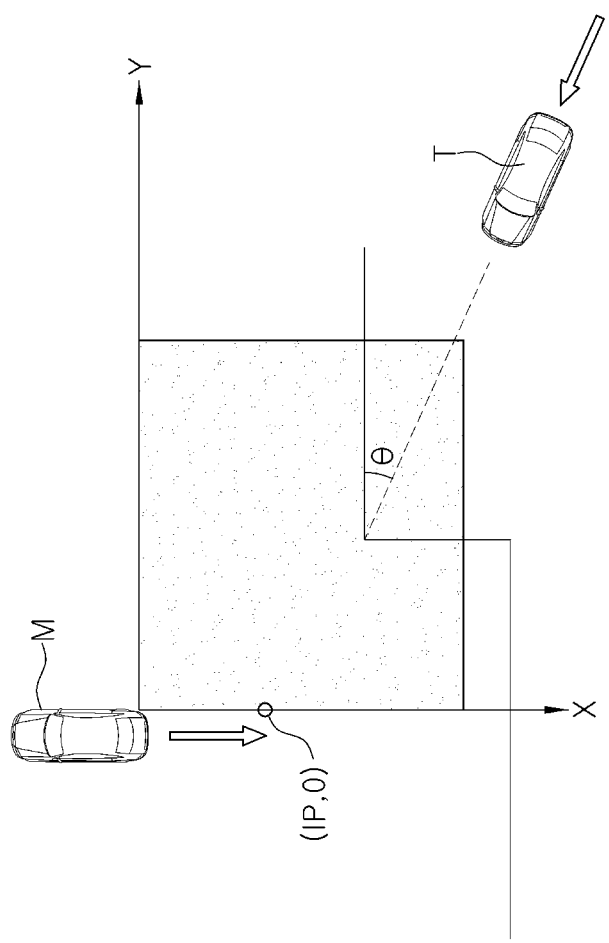
FIG. 2 is a view for explaining a process in which the vehicle according to the embodiment of the present disclosure controls whether to send a warning of a collision based on a velocity of a target vehicle.
Figure 2:

FIG. 2 is a view for explaining a process in which the vehicle according to the embodiment of the present disclosure controls whether to send a warning of a collision based on a velocity of the target vehicle.

With reference to FIG. 2, a vehicle M corresponds to a vehicle including the constituent elements in FIG. 1. A target vehicle T is a vehicle detected by the sensing part of the vehicle M.

When the vehicle M is at the R shift position (i.e., the vehicle M moves rearward), the vehicle M may activate a rear cross-traffic alert function and control whether to send a warning of a collision with the target vehicle T based on the detection information such as a position and velocity of the target vehicle T detected by the sensing part in the state in which the rear cross-traffic alert function is activated.

In case that for the conditions required to send the warning of a collision are satisfied, the vehicle M may send the warning of a collision with the target vehicle T. The conditions required to send a warning of a collision may include a condition in which the position of the target vehicle T needs to be within a region of a warning of a collision, a condition in which an approach angle θ of the target vehicle T needs to be a preset angle or less, a condition in which the time-to-collision (TTC) between the vehicle M and the target vehicle T needs to be a predetermined time or less, and a condition in which a predicted position of a collision (impact point (IP)) between the vehicle M and the target vehicle T needs to be present in a preset region. However, the present disclosure is not necessarily limited thereto. In this case, the condition in which the approach angle θ needs to be the preset angle or less may be set to prevent an erroneous warning against the target vehicle T that approaches the vehicle in an X-axis direction.

The approach angle θ of the target vehicle T may be determined based on an X-axis velocity $V_x$ and a Y-axis velocity $V_y$ of the target vehicle T based on Equation 1 below.

$$\theta = \tan^{-1}\frac{V_x}{V_y} \quad \text{Equation 1}$$

The predicted position of a collision (IP) between the vehicle M and the target vehicle T may be determined based on Equation 2 below. Here, $X_a$, and $Y_a$ may be respectively an X-axis coordinate and a Y-axis coordinate with respect to a current detection position of the target vehicle T detected by the sensing part of the vehicle M.

$$IP = -\left(\frac{V_x}{V_y}\right)Y_a + X_a \quad \text{Equation 2}$$

The time-to-collision (TTC) between the vehicle M and the target vehicle T may be determined based on Equation 3 below.

$$TTC = -\frac{Y_a}{V_y} \quad \text{Equation 3}$$

Meanwhile, as shown in Equation 4 below, the approach angle θ of the target vehicle T may be used to determine $X_c$ and $Y_c$ by compensating for the X-axis coordinate $X_a$ and the Y-axis coordinate $Y_a$ with respect to the current detection position of the target vehicle T.

$$\begin{bmatrix} X_c \\ Y_c \end{bmatrix} = \begin{bmatrix} \cos\theta & -\sin\theta \\ \sin\theta & \cos\theta \end{bmatrix} \begin{bmatrix} X_a \\ Y_a \end{bmatrix} \quad \text{Equation 4}$$

In addition, as shown in Equation 5 below, the approach angle θ of the target vehicle T may be used to determine $V_{xc}$ and $V_{yc}$ by compensating for the X-axis velocity $V_x$ and the Y-axis velocity $V_y$ of the target vehicle T.

$$\begin{bmatrix} X_{xc} \\ Y_{yc} \end{bmatrix} = \begin{bmatrix} \cos\theta & -\sin\theta \\ \sin\theta & \cos\theta \end{bmatrix} \begin{bmatrix} V_x \\ V_y \end{bmatrix} \quad \text{Equation 5}$$

By using $X_c$, $Y_c$, $V_{xc}$, and $V_{yc}$ determined based on Equations 4 and 5, $\theta_c$ may be determined by compensating for the approach angle θ of the target vehicle T based on Equation 6 and $IP_c$ may be determined by compensating for the predicted position of a collision (IP) based on Equation 7.

$$\theta_c = \tan^{-1} \frac{V_{xc}}{V_{yc}} \quad \text{Equation 6}$$

$$IP_c = -\frac{V_{xc}}{V_{yc}} Y_c + X_c \quad \text{Equation 7}$$

Therefore, the vehicle M may select and use one of the approach angle θ and the compensated approach angle $\theta_c$ to determine whether to send a warning of a collision and select and use one of the predicted position of a collision (IP) and the compensated predicted position of a collision ($IP_c$) to determine whether to send the warning of a collision.

As described above, the vehicle M may determine the approach angle θ of the target vehicle T and the predicted position of a collision (IP) with the target vehicle T based on the X-axis velocity $V_c$ and the Y-axis velocity $V_y$ of the target vehicle T and control whether to send a warning of a collision based on the determination result.

However, in case that an error with respect to the X-axis velocity $V_x$ and the Y-axis velocity $V_y$ increases, errors of the approach angle θ and the predicted position of a collision (IP) increase, which may degrade the accuracy of the warning of a collision sent by the vehicle M. In more detail, the errors of the X-axis velocity $V_x$ and the Y-axis velocity $V_y$ may increase in case that the detection accuracy of the rear radar sensor deteriorates because multiple reflection points are formed with respect to the target vehicle or a small position error increases to a large velocity error.

Therefore, the present embodiment proposes the configuration that improves the accuracy of a warning of a collision by determining the approach angle of the target vehicle and the predicted position of a collision based on the position of the target vehicle and controlling whether to send the warning of a collision with the target vehicle based on the determination result.

Figure 3:
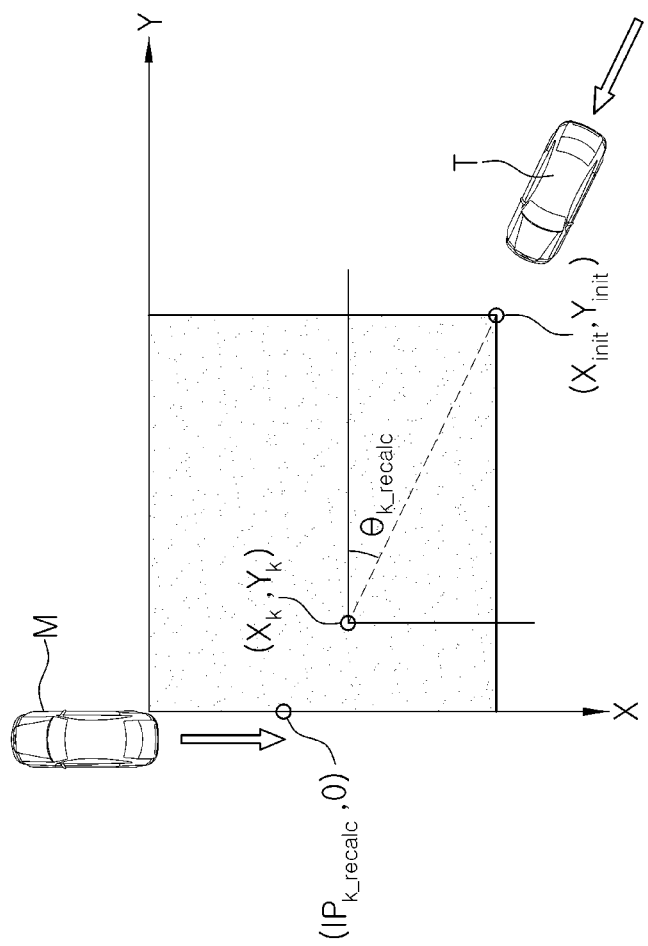
FIG. 3 is a view for explaining a process in which the vehicle according to the embodiment of the present disclosure controls whether to send a warning of a collision based on a position of the target vehicle.
Figure 3:

FIG. 3 is a view for explaining a process in which the vehicle according to the embodiment of the present disclosure controls whether to send a warning of a collision based on a position of the target vehicle.

With reference to FIG. 3, the vehicle M may sequentially set an initial detection position ($X_{init}$, $Y_{init}$) and a subsequent detection position ($X_k$, $Y_k$) of the target vehicle T by detecting the position of the target vehicle T by using the sensing part and determine the approach angle $\theta_{k\_recale}$ of the target vehicle T and the predicted position of a collision ($IP_{k\_recale}$ between the vehicle M and the target vehicle T based on the initial detection position ($X_{init}$, $Y_{init}$) and the subsequent detection position ($X_k$, $Y_k$). Here, $X_{init}$ and $Y_{init}$ may correspond to the X-axis coordinate and the Y-axis coordinate of the initial detection position of the target vehicle T, and $X_k$ and $Y_k$ may correspond to the X-axis coordinate and the Y-axis coordinate of the subsequent detection position of the target vehicle T.

Figure 4:
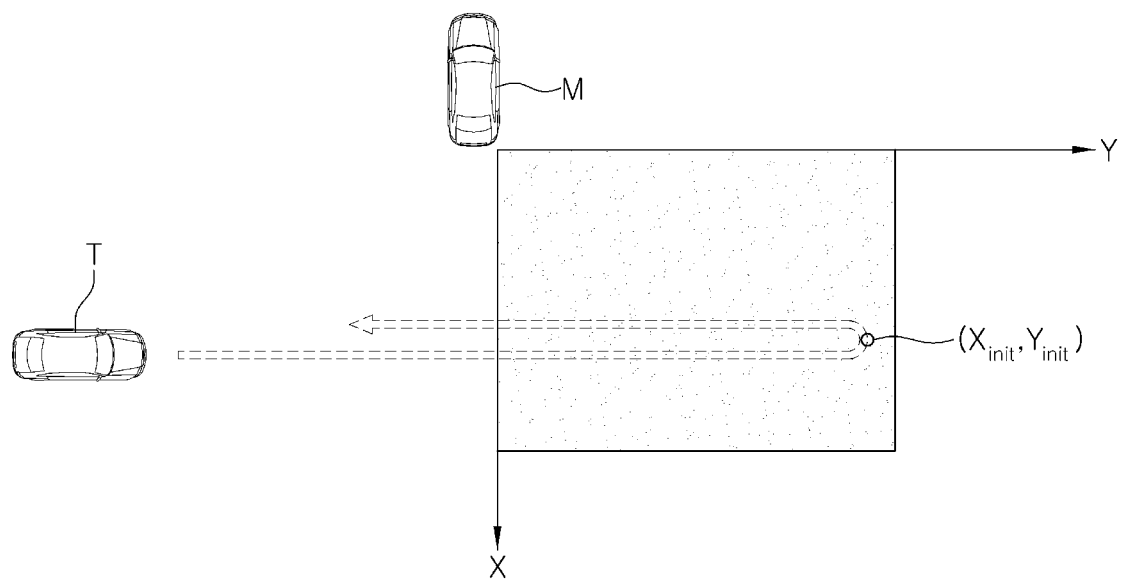
FIG. 4 is a view for explaining a process in which the vehicle according to the embodiment of the present disclosure sets an initial detection position of the target vehicle.

The initial detection position ($X_{init}$, $Y_{init}$) may be determined depending on a movement direction of the target vehicle T detected by the sensing part of the vehicle M. More specifically, the vehicle M may determine the movement direction of the target vehicle T based on the velocity of the target vehicle T detected by the sensing part and set the current detection position of the target vehicle T to the initial detection position ($X_{init}$, $Y_{init}$) when the target vehicle T is present within the region of the warning of a collision in the state in which the movement direction of the target vehicle T is a preset movement direction. FIG. 4 illustrates a process in which the vehicle M sets the initial detection position of the target vehicle T. In this case, it is assumed that the rear radar sensor is disposed at a rear right side of the vehicle M. In this case, the vehicle M may detect a movement of the target vehicle T from the right side of the vehicle M to the left side of the vehicle M and send a warning of a collision. Therefore, the vehicle M may set the current detection position of the target vehicle T to the initial detection position when the target vehicle T is present in the region of the warning of a collision in a state in which a Y-axis velocity $V_y$ of the target vehicle T is lower than '0'.

With reference back to FIG. 3, the vehicle M may set the current detection position ($X_a$, $Y_a$) of the target vehicle T to the subsequent detection position ($X_k$, $Y_k$) of the target vehicle T when a current detection distance ($R_a$ of the target vehicle T is smaller than a distance made by subtracting a preset critical distance ($R_{cale\_thr}$ from an initial detection distance ($R_{init}$ of the target vehicle T, as shown in Equation 8 below. In this case, the initial detection distance ($R_{init}$) may be determined based on Equation 9 below and correspond to a distance between the initial detection position ($X_{init}$, $Y_{init}$) and the position of the vehicle M. In addition, the current detection distance ($R_a$) may be determined based on Equation 10 below and correspond to a distance between the current detection position ($X_a$, $Y_a$) and the position of the vehicle M.

$$R_a < R_{init} - R_{calc\_thr} \quad \text{Equation 8}$$

$$R_{init} = \sqrt{X_{init} * X_{init} + Y_{init} * Y_{init}} \quad \text{Equation 9}$$

$$R_a = \sqrt{X_a * X_a + Y_a * Y_a} \quad \text{Equation 10}$$

Thereafter, the vehicle M may determine the approach angle ($\theta_{k\_recalc}$) and the predicted position of a collision ($IP_{k\_recalc}$) based on the initial detection position ($X_{init}$, $Y_{init}$) and the subsequent detection position ($X_k$, $Y_k$) and control whether to send a warning of a collision based on the approach angle ($\theta_{k\_recalc}$) and the predicted position of a collision ($IP_{k\_recalc}$). In this case, the vehicle M may control whether to send a warning of a collision depending on whether the approach angle ($\theta_{k\_recalc}$) is a preset angle or smaller and whether the predicted position of a collision ($IP_{k\_recalc}$) is present in a preset region.

The approach angle ($\theta_{k\_recalc}$) is set to an angle between a line, which connects the initial detection position and the subsequent detection position of the target vehicle T, and a reference line (Y-axis) of the vehicle. The vehicle M may set the approach angle ($\theta_{k\_recalc}$) based on Equation 11 below.

$$\theta_{k_{recalc}} = \tan^{-1}\frac{X_k - X_{init}}{Y_k - Y_{init}} \quad \text{Equation 11}$$

The predicted position of a collision ($IP_{k\_recalc}$) may be determined based on Equation 12 below.

$$IP_{k\_recalc} = -\frac{X_k - X_{init}}{Y_k - Y_{init}} Y_k + X_k \quad \text{Equation 12}$$

Therefore, the vehicle M may select and use one of the approach angle ($\theta$ in FIG. 2), the compensated approach angle ($\theta_c$ in FIG. 2), and the approach angle ($\theta_{k\_recalc}$) to determine whether to send a warning of a collision and select and use the predicted position of a collision (IP in FIG. 2), the compensated predicted position of a collision ($IP_c$ in FIG. 2), and the predicted position of a collision ($IP_{k\_recalc}$) to determine whether to send a warning of a collision.

Figure 5:
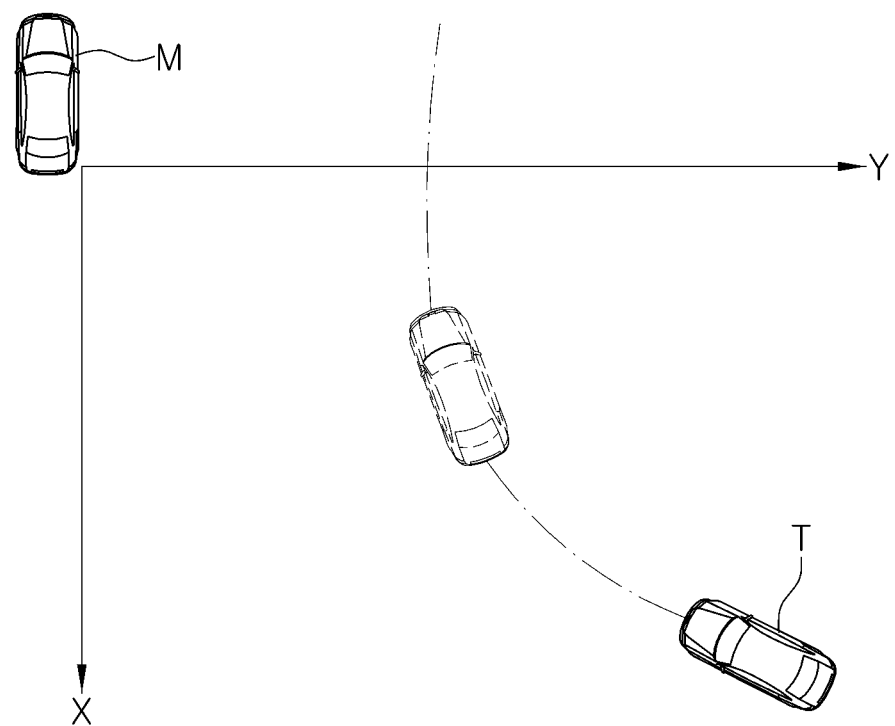
FIG. 5 is a view for explaining a process in which the vehicle according to the embodiment of the present disclosure monitors a movement route of the target vehicle.

Meanwhile, as illustrated in FIG. 5, the vehicle M may reset the current detection position of the target vehicle T to the initial detection position of the target vehicle T by periodically monitoring a route of the target vehicle T in order to prepare for a case in which a route through which the target vehicle T approaches the vehicle M is changed.

More specifically, as shown in Equation 13, the vehicle M may determine a route tracking angle ($\theta_{k\_pathcalc}$) of the target vehicle T in case that the current detection distance ($R_a$) of the target vehicle T is smaller than a distance made by subtracting a preset monitoring distance ($R_{pathcheck\_thr}$) from a route tracking start distance $R_{pathcheck}$ of the target vehicle T. In this case, the route tracking start distance $T_{pathcheck}$ may correspond to a distance between the route tracking start position of the target vehicle T and the position of the vehicle M, and an initial value may be set to the initial detection distance ($R_{init}$) of the target vehicle T.

$$R_a < R_{pathcheck} - R_{pathcheck\_thr} \quad \text{Equation 13}$$

In case that the condition of Equation 13 is satisfied, the vehicle M may determine the route tracking angle ($\theta_{k\_pathcalc}$), as shown in Equation 14 below. In this case, $X_{pathcheck}$ and $Y_{pathcheck}$ may correspond to the X-axis coordinate and the Y-axis coordinate of the route tracking start position of the target vehicle T.

$$\theta_{k\_pathcalc} = \tan^{-1}\frac{X_a - X_{pathcheck}}{Y_a - Y_{pathcheck}} \quad \text{Equation 14}$$

Thereafter, as shown in Equation 15 below, the vehicle M may determine that the movement route of the target vehicle T is changed in case that a difference between the route tracking angle ($\theta_{k\_pathcalc}$) and the approach angle ($\theta_{k\_recalc}$) is a preset critical angle ($\theta_{reset\_thr}$) or larger.

$$|\theta_{k\_pathcalc} - \theta_{k\_recalc}| > \theta_{reset\_thr} \quad \text{Equation 15}$$

In case that the condition of Equation 15 is satisfied, the vehicle M may reset the current detection position of the target vehicle T to the initial detection position of the target vehicle T and set and store the current detection position of the target vehicle T as the route tracking start position of the target vehicle T.

Figure 6:
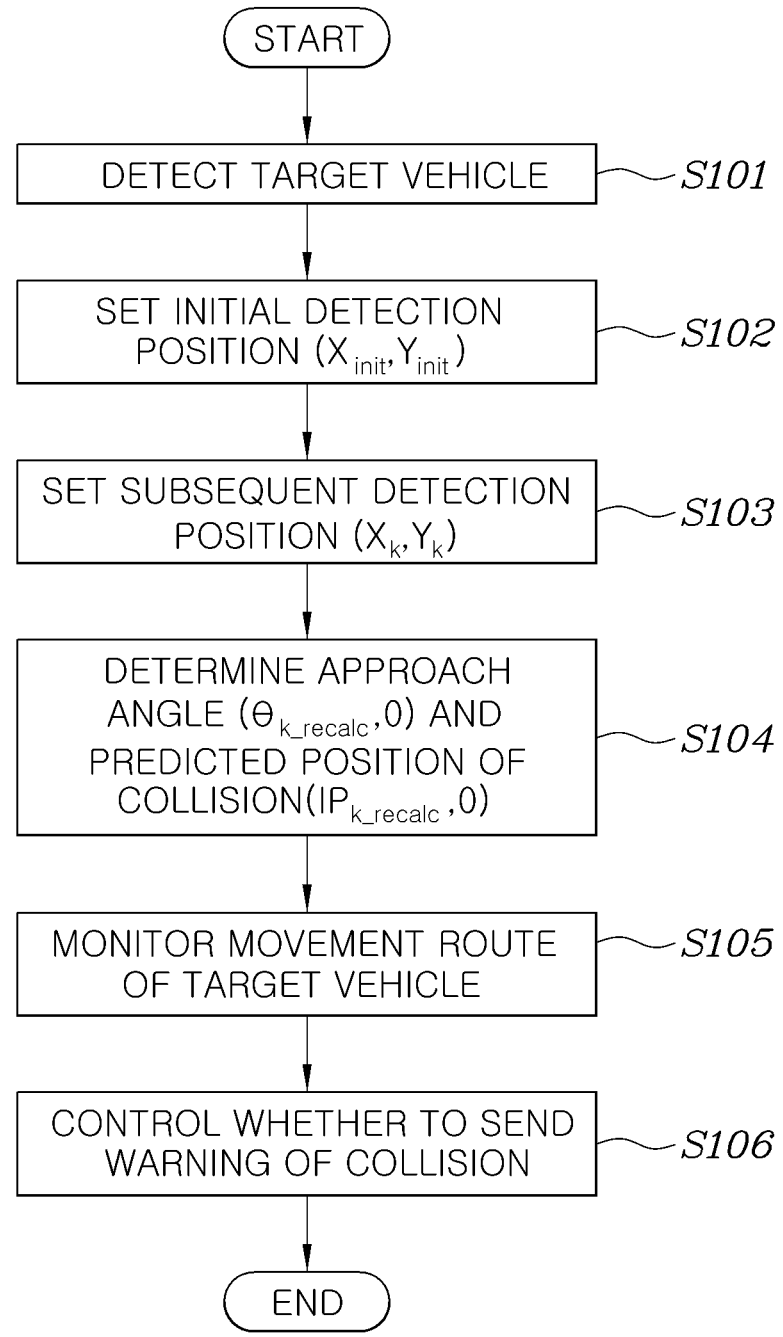
FIG. 6 is a flowchart for explaining a method of controlling the vehicle according to the embodiment of the present disclosure.

FIG. 6 is a flowchart for explaining a method of controlling the vehicle according to the embodiment of the present disclosure.

With reference to FIG. 6, the sensing part 100 of the vehicle may detect the position of the target vehicle, which approaches the vehicle, and output the sensing data (S101).

The warning-sending control part 200 of the vehicle may sequentially set the initial detection position ($X_{init}$, $Y_{init}$) and the subsequent detection position ($X_k$, $Y_k$) of the target vehicle based on the sensing data (S102 and S103).

More specifically, the warning-sending control part 200 of the vehicle may set the current detection position of the target vehicle to the initial detection position ($X_{init}$, $Y_{init}$) when the target vehicle is present in the region of the warning of a collision in the state in which the movement direction of the target vehicle is the preset movement direction (S102).

Thereafter, the warning-sending control part 200 of the vehicle may set the current detection position of the target vehicle to the subsequent detection position ($X_k$, $Y_k$) of the target vehicle in case that the current detection distance of the target vehicle is smaller than a distance made by subtracting a preset critical distance from the initial detection distance of the target vehicle (S103).

Thereafter, the warning-sending control part 200 of the vehicle may determine the approach angle ($\theta$k_recale) of the target vehicle and the predicted position of a collision ($IP_{k\_recale}$) between the vehicle and the target vehicle based on the initial detection position ($X_{init}$, $Y_{init}$) and the subsequent detection position ($X_k$, $Y_k$) of the target vehicle (S104). More specifically, the warning-sending control part 200 may set an angle between a line, which connects the initial detection position ($X_{init}$, $Y_{init}$) and the subsequent detection position ($X_k$, $Y_k$), and the reference line to the approach angle $\theta_{k\_recalc}$.

The warning-sending control part 200 of the vehicle may periodically monitor the movement route of the target vehicle. When the warning-sending control part 200 determines that the movement route of the target vehicle has been changed, the warning-sending control part 200 may reset the current detection position of the target vehicle to the initial detection position of the target vehicle (S105).

The warning-sending control part 200 of the vehicle may control whether to send a warning of a collision based on whether the approach angle $\theta_{k\_recalc}$ is the preset angle or smaller and whether the predicted position of a collision ($IP_{k\_recalc}$) is present in the preset region (S106).

Meanwhile, the present disclosure described above may be implemented as a computer-readable code on a medium on which a program is recorded. The computer-readable medium includes all kinds of storage devices for storing data readable by a computer system. Examples of computer-readable media include hard disk drives (HDDs), solid state disks (SSDs), silicon disk drives (SDDs), ROMs, RAMs, CD-ROMs, magnetic tapes, floppy discs, and optical data storage devices. Therefore, it should be appreciated that the detailed description is interpreted as being illustrative in every aspects, not restrictive. The scope of the present disclosure should be determined based on the reasonable interpretation of the appended claims, and all of the modifications within the equivalent scope of the present disclosure belong to the scope of the present disclosure.

What is claimed is:

1. A method of controlling a vehicle, the method comprising:
   detecting a position of a target vehicle other than the vehicle and sequentially setting an initial detection position and a subsequent detection position of the target vehicle;
   determining an approach angle of the target vehicle based on the initial detection position and the subsequent detection position; and
   controlling whether to send a warning of a collision based on the approach angle,
   wherein the setting of the initial detection position and the subsequent detection position of the target vehicle includes setting a current detection position of the target vehicle to the initial detection position in response that the target vehicle is present in a region of the warning of the collision in a state in which a movement direction of the target vehicle is a preset movement direction.

2. The method of claim 1,
   wherein the setting of the initial detection position and the subsequent detection position of the target vehicle includes setting the current detection position of the target vehicle to the subsequent detection position in response that a current detection distance of the target vehicle is smaller than a distance made by subtracting a preset critical distance from the initial detection distance of the target vehicle, and
   wherein the current detection distance corresponds to a distance between the current detection position of the target vehicle and a position of a host vehicle, and the initial detection distance corresponds to a distance between the initial detection position and the position of the host vehicle.

3. The method of claim 1, wherein the determining of the approach angle includes setting an angle between a line, which connects the initial detection position and the subsequent detection position, and a reference line as the approach angle.

4. The method of claim 1, wherein in the controlling of whether to send the warning of the collision, whether to send the warning of the collision is controlled depending on whether the approach angle is a preset angle or smaller than the preset angle.

5. The method of claim 1, further comprising:
   determining a predicted position of the collision based on the initial detection position and the subsequent detection position,
   wherein in the controlling of whether to send the warning of the collision, whether to send the warning of the collision is controlled depending on the predicted position of the collision.

6. The method of claim 1, further comprising:
   resetting the current detection position of the target vehicle to the initial detection position in response that a movement route of the target vehicle is changed.

7. The method of claim 6, further comprising:
   determining whether the movement route is changed, wherein the determining of whether the movement route is changed includes:
   calculating a route tracking angle of the target vehicle based on the current detection position and a route tracking start position of the target vehicle in response that a current detection distance of the target vehicle is smaller than a distance made by subtracting a preset monitoring distance from a route tracking start distance of the target vehicle; and
   determining that the movement route of the target vehicle is changed in response that a difference between the route tracking angle and the approach angle is a preset critical angle or smaller than the preset critical angle, and
   wherein the current detection distance corresponds to a distance between the current detection position and a position of a host vehicle, and the route tracking start distance corresponds to a distance between the route tracking start position and the position of the host vehicle.

8. The method of claim 7, wherein an initial value of the route tracking start position is set to the initial detection position.

9. A vehicle comprising:
   a sensing part configured to detect a position of a target vehicle other than the vehicle and output sensing data; and
   a warning-sending control part configured to sequentially set an initial detection position and a subsequent detection position of the target vehicle based on the sensing data, determine an approach angle of the target vehicle based on the initial detection position and the subsequent detection position, and control whether to send a warning of a collision depending on the approach angle,
   wherein the warning-sending control part is configured to set a current detection position of the target vehicle to the initial detection position in response that the target vehicle is present in a region of the warning of the collision in a state in which a movement direction of the target vehicle is a preset movement direction.

10. The vehicle of claim 9,
    wherein the warning-sending control part is configured to set the current detection position of the target vehicle to the subsequent detection position in response that a current detection distance of the target vehicle is smaller than a distance made by subtracting a preset critical distance from the initial detection distance of the target vehicle, and
    wherein the current detection distance corresponds to a distance between the current detection position of the target vehicle and a position of a host vehicle, and the initial detection distance corresponds to a distance between the initial detection position and the position of the host vehicle.

11. The vehicle of claim 9, wherein the warning-sending control part is configured to set an angle between a line, which connects the initial detection position and the subsequent detection position, and a reference line as the approach angle.

12. The vehicle of claim 9, wherein the warning-sending control part is configured to control whether to send the warning of the collision depending on whether the approach angle is a preset angle or smaller than the preset angle.

13. The vehicle of claim 9, wherein the warning-sending control part is configured to determine a predicted position of the collision based on the initial detection position and the subsequent detection position and to control whether to send the warning of the collision depending on the predicted position of the collision.

14. The vehicle of claim 9, wherein the warning-sending control part is configured to reset the current detection position of the target vehicle to the initial detection position in response that a movement route of the target vehicle is changed.

15. The vehicle of claim 14,
   wherein the warning-sending control part is configured to determine a route tracking angle of the target vehicle based on the current detection position and a route tracking start position of the target vehicle in response that a current detection distance of the target vehicle is smaller than a distance made by subtracting a preset monitoring distance from a route tracking start distance of the target vehicle,
   wherein the warning-sending control part is configured to determine that the movement route of the target vehicle is changed in response that a difference between the route tracking angle and the approach angle is a preset critical angle or smaller than the preset critical angle, and
   wherein the current detection distance corresponds to a distance between the current detection position and a position of a host vehicle, and the route tracking start distance corresponds to a distance between the route tracking start position and the position of the host vehicle.

16. The vehicle of claim 15, wherein an initial value of the route tracking start position is set to the initial detection position.

* * * * *